Oct. 23, 1956

E. MILLET 2,767,629

OPTICAL DEVICE FOR A STEREOSCOPIC CAMERA
WITH A HORIZONTAL MOVEMENT OF THE FILM

Filed April 13, 1954

INVENTOR
Eugene Millet.

BY
ATTORNEY

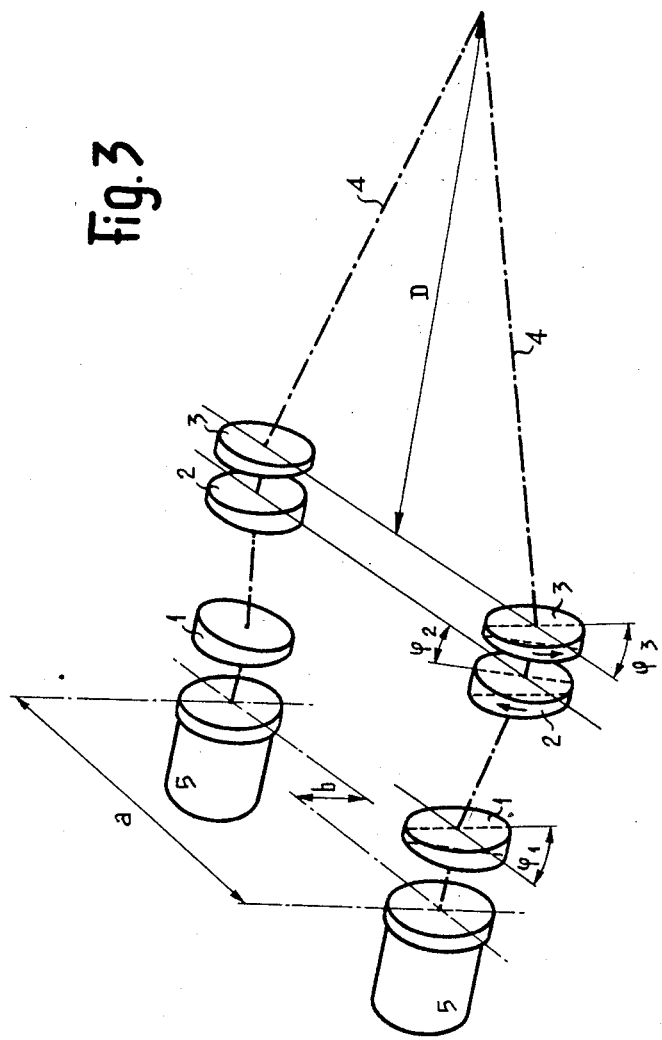

United States Patent Office 2,767,629
Patented Oct. 23, 1956

2,767,629

OPTICAL DEVICE FOR A STEREOSCOPIC CAMERA WITH A HORIZONTAL MOVEMENT OF THE FILM

Eugene Millet, Yverdon, Switzerland, assignor to Paillard S. A., Sainte-Croix, Switzerland, a corporation of Switzerland Application April 13, 1954, Serial No. 422,920

Claims priority, application Switzerland April 21, 1953

2 Claims. (Cl. 95—18)

Stereoscopic photographic cameras with a horizontal movement of the film are generally equipped with two photographing objectives spaced horizontally apart by a fixed distance in such a manner as to register each of the images taken at a different angle. This distance, called the base, is approximately equal to the spacing of the eyes. The objectives are secured to the camera in such a manner that their optical axes converge at a given distance, permitting an admissible superposition of two images of the stereoscopic couple. When this arrangement is rigid, it does not permit filming any object whatsoever, because, during projection, a convenient stereoscopic perception is only possible when the two extreme frontal planes of the object are located between two well defined limits. The zone comprised between these two limits constitutes the depth of stereoscopic field. It is defined by the deviation in convergence which perception of the relief can tolerate without fatigue. For this reason, it is necessary to be able to displace the point of convergence of the two optical axes of the camera, in such a manner as to permit filming subjects located at infinity to a distance considered as a minimum for taking views.

On the other hand, when taking stereoscopic views on a film moving horizontally, two images of the same pair of images are generally spaced in a vertical direction, this vertical spacing depending on the width of the film. Whilst for small sizes, this spacing can be tolerated, on the contrary for a larger size, such as 35 mm. for example, it becomes deleterious and must be annulled.

Some devices are already known which permit the displacing, in a vertical direction, the two luminous beams passing through the openings for taking views of a stereoscopic camera. These devices utilise, in general, two groups of two prisms with apices opposed relatively to one another, located on each of the beams passing through a photographing window. There are known, on the other hand, especially in some telemeters, combinations of prisms turning relatively to one another and permitting the producing of a continuous deviation of a luminous beam precisely by rotation of one prism relatively to the other.

The device according to the invention is of the type comprising two identical optical groups, adapted to be each located in front of a photographing window, each optical group comprising an objective and an assembly of prisms. This optical device is distinguished from known optical devices of this type by the fact that the said assembly comprises three prisms, a stationary prism being located in front of each objective, for deviating in a vertical plane and in the opposite direction, the beam of each objective. Each assembly also comprises two prisms capable of being set in rotation in the opposite direction about an axis parallel to the axis of the corresponding objective, said two prisms being located on the beam of each of the said objectives for deviating, in a horizontal plane, the two beams, in such a manner as to cause them to converge on a continuous series of points. The ratio of driving of the said two prisms and the deviation which said two prisms subject the beams which pass through them are so selected that the deviation in the vertical plane of the beam passing through the two prisms is always equal and of opposite direction to the deviation in a vertical plane of the first stationary prism so that the total vertical deviation is always zero, the vertical spacing between the emerging beam and the incident beam of each optical group being thus maintained constant irrespective of the distance of convergence of the two beams.

One form of construction of a device according to the invention is shown diagrammatically in the accompanying drawings, wherein:

Fig. 3 shows, in perspective, the general arrangement of the objectives and of the prisms in a camera for taking stereoscopic views with horizontal movement of the film.

Figure 1:
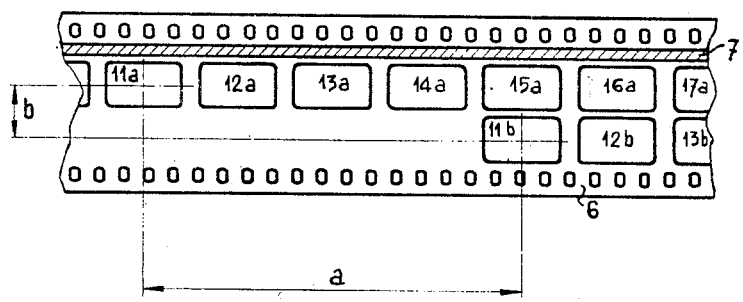
Fig. 1 shows a fragment of a film comprising two rows of images printed in a camera, in which the film moves horizontally.

The film 6, of which a portion is shown in Fig. 1, comprises a sound track 7 and two rows of images printed according to a known process by horizontal movement of the film. The images 11a and 11b have been printed simultaneously and represent the same scene taken at a different angle. The distance $a$ which separates the images 11a and 11b should be sufficient for giving an impression in relief. It is, in general, approximately equal to the spacing of the eyes. Further, the two images of the same pair are each located on a half of the film so that there remains between them a vertical spacing $b$. The images 12a and 12b have been printed in the same manner as the images 11a and 11b, but at a different moment. The same applies to the images 13a and 13b and so on.

Figure 2:
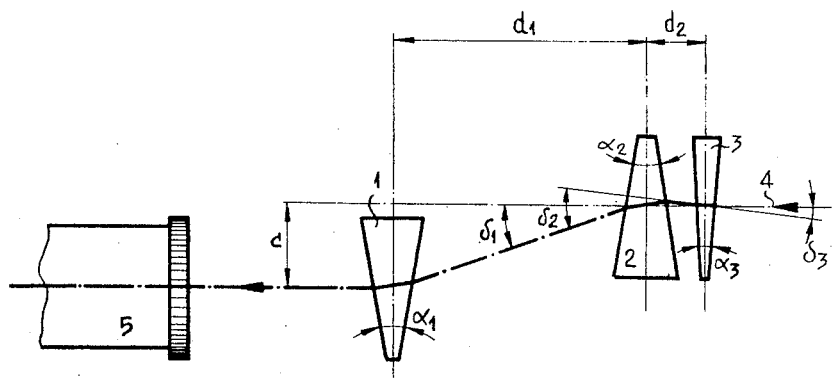
Fig. 2 shows a diagram of the principle of the device according to the invention.

In Fig. 2 is shown diagrammatically one of the two identical optical groups, adapted to be mounted on the camera to permit of the registering of the pairs of stereoscopic images, such as those shown in Fig. 1. Each of these groups constitutes an optical passage comprising an objective 5 and three prisms 1, 2 and 3. The prism 1 is stationary relatively to the camera, whereas the prisms 2 and 3 are movable angularly relatively to one another, that is to say that they can be set in rotation in the opposite direction to one another, about an axis parallel to the axis of the corresponding objective 5. Said two prisms 2 and 3 are selected in such a manner as to permit, according to the known principle, the horizontal deviation (perpendicularly to the plane of the drawing in Fig. 1) of the principal ray 4.

In Fig. 2, the prisms 1, 2 and 3 are shown by considering the plane of their principal section as being located vertically, that is to say in the plane of the sheet of the drawing. The angles $\alpha_1$, $\alpha_2$ and $\alpha_3$ represent the angles subtended by the two faces of each of the respective prisms 1, 2 and 3. The deviation produced on the principal ray 4 in the plane of the principal section of the prisms is indicated respectively by $\delta_1$, $\delta_2$, $\delta_3$. The distance separating the prism 1 from the prism 2 is indicated by $d_1$, the distance separating the prisms 2 and 3 by $d_2$. Further, in Fig. 3, which is a view in perspective of the two optical groups, the angles formed between the plane of the main section of the prisms 1, 2 and 3 with the horizontal plane are shown by the letters $\phi_1$, $\phi_2$, $\phi_3$.

As it is necessary for the total deviation in a vertical plane, produced by the prisms 2 and 3 to be constant, equal and in the opposite direction to the deviation $\delta_1$ produced by the prism 1 on the principal ray 4, it is necessary to select the deviations $\delta_1$, $\delta_2$, $\delta_3$ and the angles $\phi_1$, $\phi_2$, $\phi_3$, according to a determined relation. This relation is as follows:

$$\delta_v = \delta_1 \sin \phi_1 + \delta_2 \sin \phi_2 + \delta_3 \sin \phi_3 = 0$$

The horizontal deviation $\delta_h$ necessary for the convergence of two beams should satisfy the following condition:

$$\delta_h = \delta_1 \cos \phi_1 + \delta_2 \cos \phi_2 + \delta_3 \cos \phi_3$$

In the particular case, where all the prisms 1, 2 and 3 are constructed of glass of the same quality, it is possible to say that the condition to be satisfied is that the difference in the angles between the sections of the two faces of each of the two rotary prisms 2 and 3 in a vertical plane, passing through the axis of the corresponding objective, is equal to the angle between the two faces of the stationary prism 1.

In the example described above, it is assumed that the optical axes of the two objectives 5 of the camera converge, for example at 2 m. The horizontal deviation $\delta_h$ of the two principal rays 4 is provided in a manner as to permit of the movement of the point of convergence on a continuous series of points on opposite sides of the distance of 2 m. This continuous series may be extended, for example from infinity to 0.50 m. By way of example a numerical example is shown hereinafter indicating the values relating to an optical device adapted to equip a stereoscopic camera for 35 mm. films. The vertical deviation $\delta_1$, which remains constant, permits of maintaining for each passage a constant vertical spacing $c$ of 5.5 mm. between the emerging beam and the incident beam, the vertical spacing $b$ to be eliminated being 11 mm. The horizontal deviation $\delta_h$ in this example may vary in such a manner as to permit of filming subjects located at a distance D from the camera passing from infinity up to 0.50 m.

By $\Delta\phi_2$, $\Delta\phi_3$ respectively are indicated the variations of the angles $\phi_2$ and $\phi_3$ during the angular movements of the prisms 2 and 3.

*Numerical table*

| $\varphi_3$ | $\Delta\varphi_3$ | $\varphi_2$ | $\Delta\varphi_2$ | $\delta_1$ | $\delta_h$ | D |
|---|---|---|---|---|---|---|
| −104°26′20″ | −14°26′20″ | 95°55′20″ | 5°55′20″ | 5°43′50″ | −1°1′20″ | ∞ |
| −97°30′ | −7°30′ | 93°4′30″ | 3°4′30″ | 5°43′50″ | −31′50″ | 4.18 m. |
| −90° | 0° | 90° | 0° | 5°43′50″ | 0° | 2 |
| −82°30′ | 7°30′ | 86°55′30″ | −3°4′30″ | 5°43′50″ | 31′50″ | 1.31 |
| −75° | 15° | 83°51′ | −6°9′ | 5°43′50″ | 1°3′40″ | 0.98 |
| −67°30′ | 22°30′ | 80°46′30″ | −9°13′30″ | 5°43′50″ | 1°34′50″ | 0.78 |
| −60° | 30° | 77°42′ | −12°18′ | 5°43′50″ | 2°5′20″ | 0.66 |
| −52°30′ | 37°30′ | 74°37′30″ | −15°22′30″ | 5°43′50″ | 2°35′20″ | 0.57 |
| −45° | 45° | 71°33′ | −18°27′ | 5°43′50″ | 3°3′40″ | 0.50 |

As shown clearly in the above table, the optical device described, although only comprising two assemblies of three prisms, permits effectively, a continuous variation of the point of convergence of the two optical axes passing through the photographing windows, whilst permitting the eliminating of the vertical spacing of the latter.

It will be understood that each of the prisms 1, 2 or 3 may be formed by a prism composed of a number of elementary prisms of glass of different quality.

I claim:

1. A stereoscopic camera wherein the film moves horizontally, comprising, in combination, a front plate having two spaced exposure apertures and two optical systems mounted in front of said front plate, each optical system being positioned in front of each exposure aperture and comprising an objective adjacent the aperture and an assembly of prisms comprising essentially a stationary prism means for deviating beams in vertical planes in opposite directions, said prism means being positioned in front of, and adjacent to, the objective, and two prisms each mounted for angular rotation with respect to each other about the axis parallel to the axis of the objective, said two prisms being positioned in the beam passing through the objective, and rotating means for deviating in a vertical plane the beam passing through the said two prisms equally and in the direction opposite to the deviation of the beam in the vertical plane of the stationary prism means, said rotating means being operatively connected to said prisms, whereby the total vertical deviation of the beam is always zero thereby maintaining constant the vertical spacing between the emerging beam and the incident beam of each optical group and whereby the beams deviate in the horizontal plane in a variable manner thereby causing said beams to converge at a predetermined series of points at a predetermined distance from the camera.

2. A stereoscopic camera wherein the film moves horizontally, comprising, in combination, a front plate having two spaced exposure apertures and two optical systems mounted in front of said front plate, each optical system being positioned in front of each exposure aperture and comprising an objective adjacent the aperture and an assembly of prisms comprising essentially a stationary prism means for deviating beams in vertical planes in opposite directions, said prism means being positioned in front of, and adjacent to, the objective, and two prisms each mounted for angular rotation with respect to each other about the axis parallel to the axis of the objective, said two prisms being positioned in the beam passing through the objective, said stationary prism means and said two prisms being of similar glass, the angle between the two faces of said stationary prism means being equal to the difference in the angles between the sections of the two faces of each of the said prisms respectively, said two prisms being in a vertical plane through the horizontal axis of the corresponding objective, and rotating means for deviating in a vertical plane the beam passing through said two prisms equally and in the direction opposite to the deviation of the beam in the vertical plane of the stationary prism means, said rotating means being operatively connected to said two prisms, whereby the total vertical deviation of the beam is always zero thereby maintaining constant the vertical spacing between the emerging beam and the incident beam of each optical group and whereby the beams deviate in the horizontal plane in a variable manner thereby causing said beams to converge at a predetermined series of points at a predetermined distance from the camera.

References Cited in the file of this patent

UNITED STATES PATENTS

| | | |
|---|---|---|
| 1,209,498 | Richard | Dec. 19, 1916 |
| 1,815,208 | Moraz | July 21, 1931 |
| 2,453,075 | Land | Nov. 2, 1948 |

FOREIGN PATENTS

| | | |
|---|---|---|
| 319,723 | Great Britain | Jan. 2, 1929 |
| 800,502 | France | May 4, 1936 |